(12) United States Patent
Urabe et al.

(10) Patent No.: US 7,204,260 B2
(45) Date of Patent: Apr. 17, 2007

(54) APPARATUS FOR CLEANING POLYMERIC PIECES

(75) Inventors: Kenichi Urabe, Tokyo (JP); Takateru Imai, Tokyo (JP)

(73) Assignee: Techno Polymer Co., Ltd. (JP)

( * ) Notice: Subject to any disclaimer, the term of this patent is extended or adjusted under 35 U.S.C. 154(b) by 518 days.

(21) Appl. No.: 10/295,166

(22) Filed: Nov. 15, 2002

(65) Prior Publication Data

US 2003/0094188 A1 May 22, 2003

(30) Foreign Application Priority Data

Nov. 21, 2001 (JP) ............... 2001-355660

(51) Int. Cl.
*B08B 3/04* (2006.01)
(52) U.S. Cl. .................. 134/65; 134/132; 134/134; 134/182; 134/186
(58) Field of Classification Search .............. 134/65, 134/132, 134, 149, 154, 155, 157, 182, 186
See application file for complete search history.

(56) References Cited

U.S. PATENT DOCUMENTS

| | | | |
|---|---|---|---|
| 4,013,497 A | | 3/1977 | Wolf |
| 5,443,652 A | * | 8/1995 | Scarola et al. ............. 134/7 |
| 5,632,195 A | * | 5/1997 | Zittel .................... 99/348 |
| 6,238,516 B1 | * | 5/2001 | Watson et al. ............. 162/8 |
| 6,299,508 B1 | * | 10/2001 | Gagliardi et al. .......... 451/28 |
| 6,742,529 B2 | * | 6/2004 | Imai et al. ............... 134/63 |
| 6,833,014 B2 | * | 12/2004 | Welygan et al. ........... 51/293 |

FOREIGN PATENT DOCUMENTS

| | | | |
|---|---|---|---|
| DE | 92 12 312 U1 | | 2/1993 |
| EP | 129518 A | * | 12/1984 |
| JP | 57 159612 A | | 10/1982 |
| JP | 07-016444 | | 1/1995 |
| JP | 07-276364 | | 10/1995 |
| JP | 2001-121093 | | 5/2001 |
| JP | 2001145920 A | * | 5/2001 |
| KR | 1992-5802 | | 8/1992 |

* cited by examiner

*Primary Examiner*—Joseph L. Perrin
(74) *Attorney, Agent, or Firm*—Fitch, Even, Tabin & Flannery

(57) ABSTRACT

A cleaning apparatus capable of sufficiently removing foreign matters such as coating or labels from surfaces of crushed pieces of the collected polymeric mold product is provided. The cleaning apparatus includes a cleaning bath provided with a rotary shaft extending in the longitudinal direction and having a water supply port, a drainage port as well as an introduction port and a discharging port for polymeric pieces, screw sections having a screw provided on the rotary shaft and flow-path restricting sections having stationary plates standing upright from the inner surface of the cleaning bath to restricting the advancement of water caused by the screw, wherein at least part of a surface of the stationary plate is roughened.

9 Claims, 5 Drawing Sheets

APPARATUS FOR CLEANING POLYMERIC PIECES

This application claims priority from Japanese Patent Application No. 2001-355660 filed Nov. 21, 2001, which is incorporated hereinto by reference.

BACKGROUND OF THE INVENTION

1. Field of the Invention

The present invention relates to an apparatus for cleaning polymeric pieces. For instance, mold products of polymer such as thermoplastic resin (hereinafter referred to as "resin") are collected and crushed or ground (hereinafter referred to as "crushed") to be polymeric pieces. The present invention relates to an apparatus for cleaning such polymeric pieces for the purpose of re-using the same. More specifically, it relates to a cleaning apparatus for removing foreign matters from the polymeric pieces, such as coated or plated films applied to the surface of the polymeric mold products or labels or seals attached to the surface of the polymeric mold products or contaminant.

2. Description of the Related Art

At present, a large amount of various polymeric mold products have been used in a wide scope of use accompanied with the variety of life. There are various problems, however, in such variety of mold products after they have been used, as described below.

Most of the polymers have favorable features in resistance to water, resistance to weather or resistance to corrosion. However, a large amount of smoke and toxic gases are generated when the polymeric mold product is incinerated after being discarded, to contaminate the environment. Also, molten polymer may be adhered to a furnace wall to damage the incineration furnace. On the other hand, if they are buried under the ground, they remain unchanged for a long time without decay or decomposition to be one cause of the environmental disruption.

Also, since fossil resources itself which becomes raw material of polymer has been exhausted nowadays, it is required to reuse the used mold products without discarding the same.

The collected mold products, however, are often coated or plated with a film or applied with labels or seals or contaminated with various contaminant. Accordingly, there is a problem in that these foreign matters are mixed into the regenerated polymer during the regeneration treatment of the mold products to significantly deteriorate the properties of the obtained polymer. For this reason, at present, the polymer obtained from the collected mold products after the regeneration treatment is not generally used for the same utilization in which the polymer has been used before it is collected.

While various methods have been tried to remove the foreign matters from the surface of the molded product, such as a mechanical method or a solvent method, there are problems in either of them. For example, when the coated film or label is removed by using a crusher such as a ball mill, the polymer is softened due to the heat generated by friction during the crushing, resulting in the difficulty of removal of foreign matters or the re-adhesion of the foreign matters once removed. In the method in which the solvent is used for dissolving the foreign matters and separating the same, there is a problem in the regeneration or discarding of the used solvent, which requires a complicated structure of the apparatus used for the treatment and is uneconomical.

Another method for removing coated or plated film, label or others is a dry blast treatment in which abrasive material such as sand or metallic particle is used for scraping the foreign matters from the surface of the molded product. In this method, however, the abrasive material may bite into the surface of the polymeric mold product and remain there to form new foreign matters. Further, there is a problem in that polymer may be softened by the frictional heat of the abrasive material and the foreign matters once removed are adhered again thereto.

SUMMARY OF THE INVENTION

The present invention has been made to solve the above-mentioned problem by providing an apparatus for cleaning polymeric pieces wherein when polymeric mold products are collected and regenerated as polymeric material, foreign matters such as coated or plated film or labels on the original mold products are sufficiently removed so that the regenerated polymer is usable again in the same use as before.

An apparatus for cleaning polymeric pieces according to one aspect of the present invention comprises an elongate cleaning bath having a rotary shaft (s) extending in the longitudinal direction of the cleaning bath and driven by a drive source; the cleaning bath having a water supply port (s) and a drainage port (s) as well as a polymeric piece introduction port (s) at one end and a polymeric piece discharging port (s) at the other end, a screw (s) integral with the rotary shaft for advancing water in the cleaning bath from the one end to the other end thereof by rotating the water within the cleaning bath together with the rotary shaft, and a stationary plate (s) standing upright from an inner surface of the cleaning bath for restricting the advancement of the water caused by the screw, having a rough section on at least part of a surface thereof.

In other word, the apparatus for cleaning polymeric pieces according to the present invention is characterized by the stationary plate standing upright from the inner surface of the cleaning bath, having both of a function as a flow-path restricting member for restricting the advancement of water due to the screw and a cleaning function for scraping the foreign matters off from the surface of the polymeric pieces by the rough surface.

The screw advances water in the cleaning bath together with the polymeric pieces to be cleaned in the longitudinal direction. The stationary plate functioned as a flow-path restricting member is provided to cause the advancement of water and polymeric pieces to deviate from a straight line. That is, the flow direction thereof due to the action of the screw is disturbed so that the advancement is restricted. As a result, the residence time of the water and the polymeric pieces in the cleaning bath becomes longer and the flow direction is disturbed. This increases the possibility and times of the contact of polymeric pieces with the rough surface of the stationary plate, whereby the foreign matters on the surface of the polymeric piece such as coated film or label are more assuredly scraped off to result in a high cleaning effect.

Other than the surface of the stationary plate, for example, the inner surface of the cleaning bath, the blade surface of the screw or the circumference of the rotary plate or at least part of such surfaces may be formed as a rough surface. In this case, the action for removing the foreign matters from the surface of the polymeric pieces is more enhanced.

The surface roughening may be carried out by a blast surface-treatment wherein hard particles of sand, metal or ceramics are blown at a high speed onto the surface to be roughened or a flame spraying/welding treatment wherein hard metal (METECO powdery alloy available from METECO Co., tungsten carbide or others) or ceramics are sprayed or welded on the surface to be roughened.

A surface roughness of the roughened section has the maximum height in a range from approximately 40 to 2000 μm, for example. If the maximum height is less than 40 μm, a long time is required for removing the foreign matters. Contrarily, if the maximum height exceeds 2000 μm, the recovery of the polymer becomes low because the surface of the polymer containing a good quality portion is also scraped off. The maximum height of the surface roughness is preferably in a range from 50 to 1000 μm, more preferably from 60 to 500 μm.

The surface roughness of the roughened section may be either equal or different between the respective members (the inner surface of the cleaning bath, the blade surface of the screw, the circumference of the rotary shaft, the surface of the rotary plate or others) or between sections thereof.

If it is difficult by the economical reason or others to roughen all surfaces of all the members having a surface capable of being in contact with the polymeric pieces to be cleaned, the surface of the member having a high stationary degree is preferentially roughened. That is, the roughening is favorably carried out in such a priority as (1) a stationary member (the surface of the stationary plate, the inner surface of the cleaning bath), (2) a member attached to the rotary shaft (the blade surface of the screw, the surface of the rotary plate) and (3) the exposed circumference of the rotary shaft. The reason therefor is (a) the removal of the foreign matters from the roughened surface is easy if the former is adhered to the latter and (b) the replacement or re-roughening of the roughened section is easy even though the roughened section becomes smooth by the abrasion due to the contact with the polymeric pieces to be cleaned.

In the present invention, the screw is provided in a section extending in the longitudinal direction, and in another section having no screw, a rotary plate preferably having a roughened section on part of its surface stands upright from the circumference of the rotary shaft to restrict the advancement of water due to the screw.

In addition, according to the present invention, the rotary plates are preferably arranged in such a manner that tip ends of the respective rotary plates alternate with tip ends of the respective stationary plates in the longitudinal direction.

In the present invention, it is possible to adjust a residence time of the water and/or the polymeric pieces in the cleaning bath by properly determining the clearance between the tip end of the stationary plate and the circumference of the rotary shaft, the clearance between the circumference of the rotary plate and the tubular inner surface of the cleaning bath and the clearance between the end surface of the stationary plate and the end surface of the rotary plate opposed to the former end surface. Thereby, it is possible to properly adjust a degree of cleaning of the polymeric pieces. If each of the above-mentioned clearances is determined by taking an inner diameter of the cleaning bath, a distance between the tip end of the screw and the inner surface of the cleaning bath, a rotary speed of the screw, a length of the cleaning bath or others into account, the cleaning effect is furthermore properly adjustable.

According to the present invention, a section in which the screw is provided and a section in which the flow-path restricting member (the stationary plate, the rotary plate) is provided may alternate with each other in the longitudinal direction. If so, water and the polymeric pieces having the disturbed flowing direction and speed as microscopically seen are corrected to have a generally uniform advancement speed throughout the whole length of the cleaning bath, whereby the cleaning operation is favorably achievable in all regions of the cleaning bath. Also, since the generation of a local high pressure is suppressed thereby, it is unnecessary to give an excessive strength to the cleaning bath.

Operation of Water or Others:

In the present invention, since water is continuously or intermittently supplied into the cleaning bath during the cleaning operation and sufficiently prevailed therethrough, it acts as a lubricant between the surface of the polymeric piece and the roughened surface of the member in the cleaning bath. Thereby, the inconvenience is avoidable in that the surface of the polymeric piece is excessively scraped off. Also, since the temperature rise of the polymeric piece is restricted due to the cooling effect of water, the softening of the polymeric piece is avoidable. Further, by properly controlling the water supply speed and the drainage speed relative to the cleaning bath, foreign matters such as coated film or label removed from the polymeric piece can be quickly discharged from the cleaning bath together with water. According to this synergistic effects, it is possible to avoid foreign matters such as coated film or label from adhering again to the polymeric piece.

Also, by properly controlling the input of the polymeric pieces per unit time into the cleaning bath and the supply and discharge amount of water per unit time relative to the cleaning bath so that an amount of polymeric pieces and that of water within the cleaning bath are appropriately adjusted, it is possible to optimally regulate the cleaning effect.

A mass ratio of the polymeric pieces to water existing in the cleaning bath is preferably in a range from 1:0.3 to 1:7. If the mass ratio is controlled to satisfy this range, the water temperature is easily maintained below the softening point of the resin under the room temperature environment. If the mass ratio of water to the polymeric pieces is less than 0.3, the cooling of the interior of the cleaning bath becomes insufficient and the temperature of water in the cleaning bath rises to exceed the softening point of the resin, whereby the polymeric pieces are softened or molten to disturb the cleaning operation or the foreign matters such as coated film or label once removed from the polymeric pieces adhere again to the softened polymeric pieces. On the other hand, if the mass ratio of water to the polymeric pieces exceeds 7, the contact frequency of the polymeric pieces with the roughened surface decreases, and there may be case wherein the foreign matters such as coated film or label are not sufficiently removed.

Speed of Rotary Shaft:

The speed of the rotary shaft is preferably controlled so that the peripheral speed of the circumference of the flow-path restricting member (rotary plate, rotary cylinder or others) mounted to the rotary shaft and rotating together therewith is within a range from 0.5 to 30 m/sec. If the peripheral speed is less than 0.5 m/sec, the effect for removing the foreign matters such as coated film or label becomes insufficient. Also, if the peripheral speed exceeds 30 m/sec, it is difficult to maintain the water temperature below the softening point of the resin. When the water temperature exceeds the softening temperature of the resin, there is the above-mentioned inconvenience.

Mold Product or Others to be Cleaned:

By using the cleaning apparatus according to the present invention, it is possible to obtain polymeric pieces from the crushed pieces of various polymeric mold products (for example, a housing of domestic electric appliance such as a TV set or an electric refrigerator, a housing of OA equipment such as a personal computer or a printer, parts of these products or a broken product or part thereof) manufactured by various molding methods such as a compression molding, an injection molding or a blow molding, which polymeric pieces are free from foreign matters such as coated film, plated film or label and usable for the same use as before.

It is favorable that different kinds of polymers are not mixed together in the polymeric pieces to be cleaned by the cleaning apparatus according to the present invention (the polymeric pieces obtained by crushing the collected mold products described above). Since the polymeric pieces are not used again as they are when the different kinds of polymers are mixed therein (if reused as they are, original characteristics may deteriorate), it is necessary to classify the same after being cleaned, which requires an additional operation. Also, even if the polymeric pieces of the same kind is obtained, it is further favorable that those having different colors are not mixed together in view of the use in which they are used again.

The original mold product from which the polymeric pieces to be cleaned are obtained may either have coating, plating or label thereon or not. Any material may be used as the coating provided it is usable for the coating of resin. Also, any material may be used as the plating provided it is usable for the plating of polymer.

The polymeric mold product is cleaned after being subjected to the crushing operation and converted to the crushed pieces. The crushing operation is carried out by a crusher generally used for crushing polymer, provided it is capable of crushing the polymer to pieces having a size suitable for the cleaning. For example, a hammer mill or a cutter mill may be adopted. Upon crushing the mold product, care is preferably taken to cool the polymer, for example, by air, not to melt the polymer due to heat generation.

The maximum length of the polymeric pieces to be cleaned by the cleaning apparatus according to the present invention is in a range from 1 to 45 mm, preferably from 2 to 35 mm, more preferably from 3 to 25 mm. If the maximum length is less than 1 mm, there is a large amount of micro-crushed pieces to increase the loss of crushed pieces in the preliminary treatment. Contrarily, if the maximum length exceeds 45 mm, a surface area of the respective polymer piece is not sufficiently brought into contact with the rough section of the cleaning apparatus to deteriorate the cleaning operation. A shape of the polymeric piece is not limited provided there is no problem in the handling thereof. However, the polymeric piece having an excessively elongate shape is not favorable in view of the cleaning operation. Accordingly, a circular shape or a rectangular shape having the generally same dimension in every horizontal directions is favorable in view of the cleaning operation. If necessary, after the polymeric mold product has been crushed, micro polymeric pieces having the maximum length of 1 mm or less, metallic powder or dust may be removed by means of a vibrating screen or the like.

Polymer to be Cleaned:

Kinds of resin to be cleaned by the cleaning apparatus according to the present invention includes, for example, polyolefin type resin such as polyethylene, polypropylene or ethylene-propylene copolymer; styrene type resin such as polystyrene, rubber-modified polystyrene, acrylonitrile-butadiene-styrene copolymer (ABS resin), acrylonitrile-styrene copolymer or styrene-methylmethacrylate copolymer; and polyester type resin such as polybutylene terephthalate (PBT), polyethylene terephthalate or polyethylene naphthalate.

Also, according to the cleaning apparatus of the present invention, it is possible to clean polycarbonate (PC) resin, polysulfonic resin, polyethersulfonic resin, polyarylsulfonic resin, polyphenylene ether (PPE) resin, vinylchloride resin, vinylidenechloride resin or halogen-contained resin such as chlorinated polyethylene; polyamide resin such as 6-nylon or 66-nylon; polyamide-imid resin; and thermoplastic elastomer of polyolefin type, polystyrene type, polyester type, polyamide type or polyurethane type.

Further, various polymer blends or polymer alloy containing these polymers, such as PC/ABS alloy, PC/PS alloy, modified PPE or PBT/ABS alloy may be cleaned by the cleaning apparatus according to the present invention.

Configuration of the Cleaning Apparatus:

The direction of the rotary shaft of the cleaning apparatus according to the present invention may be either horizontal or vertical. In other words, the cleaning apparatus may be of a horizontal type or a vertical type.

If necessary, a washer, a dehydrator, a vibrating screen, an aero-selector or a metal separator may be provided in front of or behind the cleaning apparatus according to the present invention. If these apparatuses are properly arranged, it is possible to more assuredly remove the foreign matters such as coated film, plated film, label or contaminant from the polymeric pieces.

The above and other objects, effects, features and advantages of the present invention will become more apparent from the following description of embodiments thereof taken in conjunction with the accompanying drawings.

DETAILED DESCRIPTION OF PREFERRED EMBODIMENTS

With reference to the attached drawings, the preferred embodiments of the present invention will be described below.

Figure 1A:
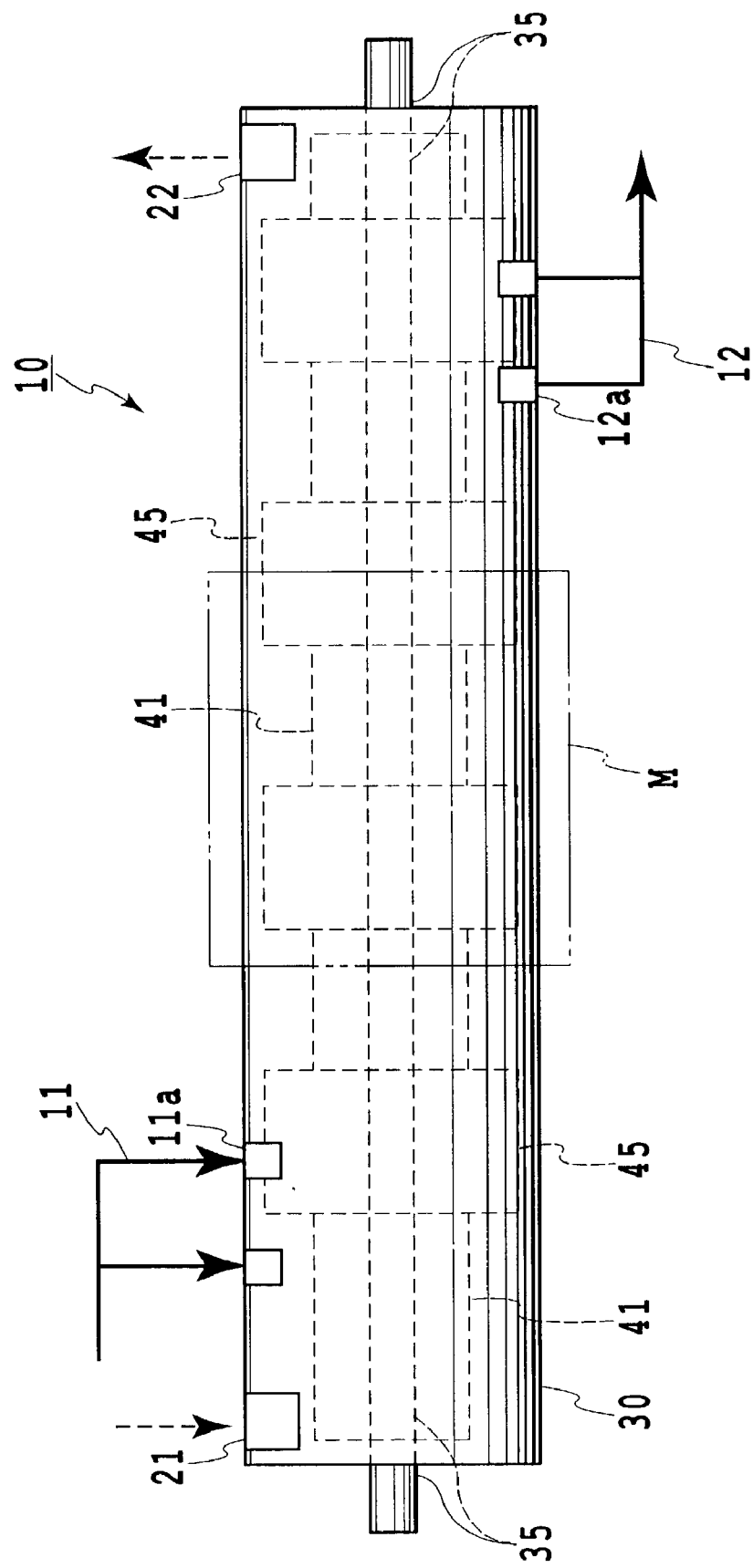
FIG. 1A is a schematic frontal illustration of the cleaning apparatus according to an embodiment of the present invention.
Figure 1C:
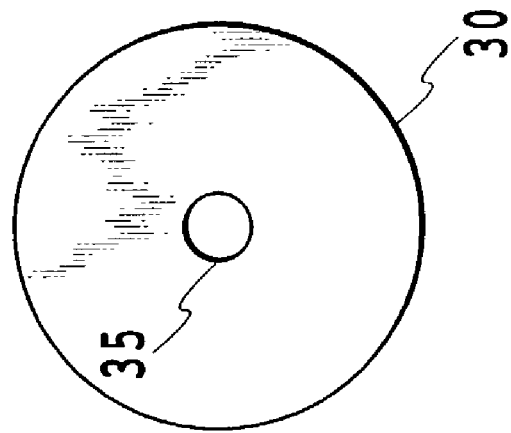
FIG. 1C is a sectional view thereof of a single-shaft type.

FIG. 1A is a schematic frontal illustration of an embodiment of the cleaning apparatus according to the present invention. The illustrated cleaning apparatus 10 has a water supply pipe 11, water supply ports 11a, a polymeric piece introduction port 21, a cleaning bath 30, a rotary shaft 35, a polymeric piece discharging port 22, drainage ports 12a and a drainage pipe 12.

The cleaning bath 30 is formed, for example, of metal such as stainless steel.

Figure 1B:
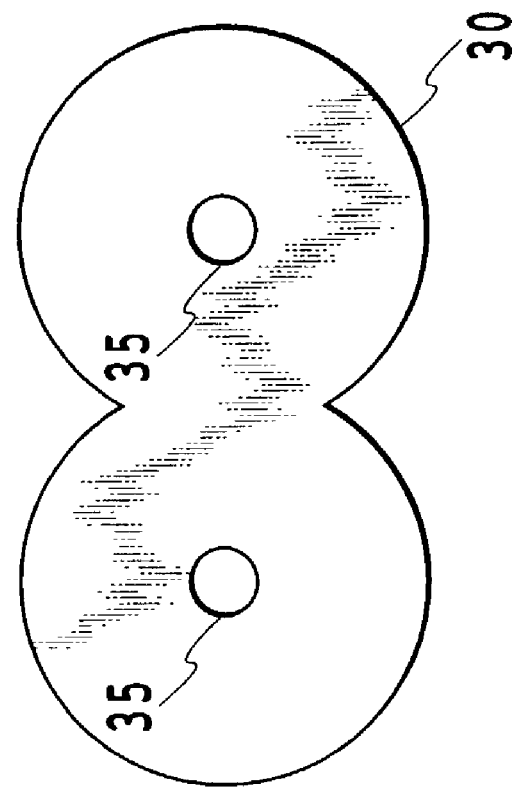
FIG. 1B is a sectional view thereof of a double-shaft type.

In the illustrated double-shaft type (FIG. 1B) apparatus, two cylinders are arranged in horizontal in a side-by-side manner in the cleaning bath 30 while communicating the contact portions thereof with each other. The rotary shaft 35 extending in the longitudinal direction is disposed generally at a center of the respective cylinder, and opposite ends thereof are supported for rotation in a water-tight manner by a support members provided on the opposite end surfaces of the cleaning bath 30. The respective rotary shafts 35 are driven to rotate in the same direction by a rotational power transmitted from a common drive source not shown.

A polymeric piece introduction port 21 is formed in an upper portion of one end (on the upstream side) of the cleaning bath 30, and a discharging port 22 is formed in an upper portion of the other end (on the downstream side) thereof. While the introduction port 21 and the discharging port 22 are provided on the upper circumference of the cleaning bath 30 in view of the convenience of handling in the illustrated embodiment, they may be provided on the end surfaces of the cleaning bath 30.

Also, the water supply ports 11a are provided on the upstream-side upper circumference of the cleaning bath 30, and the drainage ports 12a are provided on the downstream-side lower circumference thereof. In this regard, these are provided at various positions in the longitudinal direction of the tube so that the water supply or drainage is carried out at the respective positions.

Figure 2A:
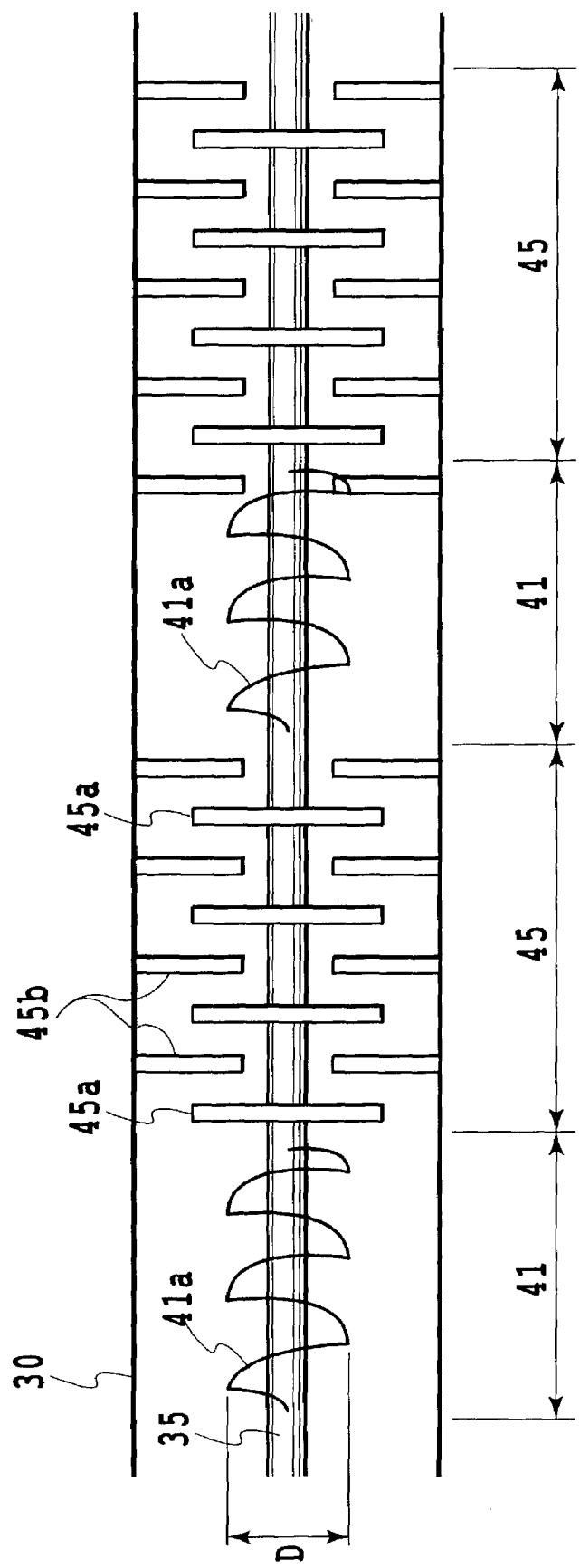
FIG. 2A is a sectional view of an area encircled by a two-dot chain line in FIG. 1A showing the detailed structure thereof.

Screw sections 41 in which a screw 41a is provided and flow-path restricting sections 45 in which flow-path restricting members 45a, 45b are provided are alternately arranged in the interior of the cleaning bath 30 in the longitudinal direction of the tube (see FIG. 2A).

The structure and the operation of the screw section 41 and the flow-path restricting section 45 will be explained with reference to FIG. 2A illustrating an area M of FIG. 1A encircled by a two-dot chain line in detail.

As illustrated, in the screw section 41, the screw 41a is attached to the rotary shaft 35 to be integral therewith. Thereby, the screw 41a rotates together with the rotary shaft 35 to advance water and polymeric pieces in the cleaning bath 30 from the introduction port 21 to the discharging port 22 (from left to right in the drawing).

An axial length of the screw blade at one position is preferably in a range from 0.5 to 5 relative to a diameter thereof. A pitch of the screw blade must be determined with reference to the rotational speed and is preferably in a range from 0.3D to 3D (D is a diameter of the screw blade). If the pitch is less than 0.3D, a gap between the adjacent screw blades becomes excessively small to catch the polymeric piece therein, which may rotate as it is and is not smoothly conveyed forward. Also, there may be a case wherein the polymeric piece caught by the gap is molten to interrupt the cleaning treatment. Contrarily, if the pitch exceeds 3D, the conveyance efficiency is lowered.

As illustrated, in the flow-path restricting section 45, a plurality of rotary plates 45a are attached to the rotary shaft 35 to be integral therewith while standing upright from the circumference of the rotary shaft 35 toward the tubular inner surface of the cleaning bath 30 to be vertical to the longitudinal direction of the tube. Also, a plurality of stationary plates 45b are attached to the tubular inner surface of the cleaning bath 30 to be integral therewith while standing upright from the tubular inner surface of the cleaning bath 30 toward the rotary shaft 35 to be vertical to the longitudinal direction of the tube. The plurality of rotary plates 45a and the stationary plates 45b are alternately arranged in the longitudinal direction of the tube to form a labyrinth. Thereby, when the rotary shaft 35 rotates to advance water and the polymeric pieces in the longitudinal direction of the tube (from left to right in the drawing), the water and the polymeric pieces are made to deviate their advancing direction by impinging to the end surfaces of the rotary plates 45a and/or the stationary plates 45b and advance in the longitudinal direction of the tube as a whole while flowing partially in the direction vertical to the longitudinal direction of the tube. Thus, the residence time of the water and the polymeric pieces within the cleaning bath 30 is prolonged and the flowing direction thereof changes to depict a complicated trace, whereby the number of contacts of the polymeric piece with the surfaces of the respective members in the interior of the cleaning bath 30 increases. To enhance the effect of the flow-path restricting section 45, a reverse screw (for example, a rotary plate 45a having a reverse twist to that of the screw 41a) capable of reversely advancing material from the exit to the inlet may be provided in part of the flow-path restricting section 45.

As described above, according to this apparatus, since the screw sections 41 and the flow-path restricting sections 45 are alternately arranged in the longitudinal direction of the tube, water and/or polymeric pieces advancing by the action of the screws 41a are made to deviate their flowing direction by the flow-path restricting sections 45 to reduce their advancement speed, which process is carried out at the respective section in the longitudinal direction.

The surfaces of the respective members in the cleaning bath 30 (the tubular inner surface of the cleaning bath 30, the exposed surface of the rotary shaft 35, the blade of the screw 41a, the end surface of the rotary plate 45a or the end surface of the stationary plate 45b) are roughened by the blast treatment by hard particles and/or the flame spraying/welding treatment, whereby if the number of contacts of the polymeric piece with the surfaces of the respective members in the interior of the cleaning bath 30 increases, the foreign matters such as coated film/label/contaminant of the polymeric pieces are easily scraped off from the surface thereof to enhance the cleaning effect.

A flowing locus or a flowing time of water and the polymeric pieces suitable for achieving the favorable cleaning effect is obtainable by properly adjusting the speed of the rotary shaft 35, the inner tubular diameter of the cleaning bath 30, a tubular length of the cleaning bath 30, a clearance B between the circumference of the rotary plate 45a and the tubular inner surface of the cleaning bath 30, a clearance C between the inner circumference of the stationary plate 45b and the circumference of the rotary shaft 35 and/or a clearance A between the end surface of the rotary plate 45a and the adjacent end surface of the stationary plate 45b. Also, it is obtainable by properly regulating lengths of the screw section 41 and the flow-path restricting section 45 and/or a ratio therebetween.

Figure 2B:
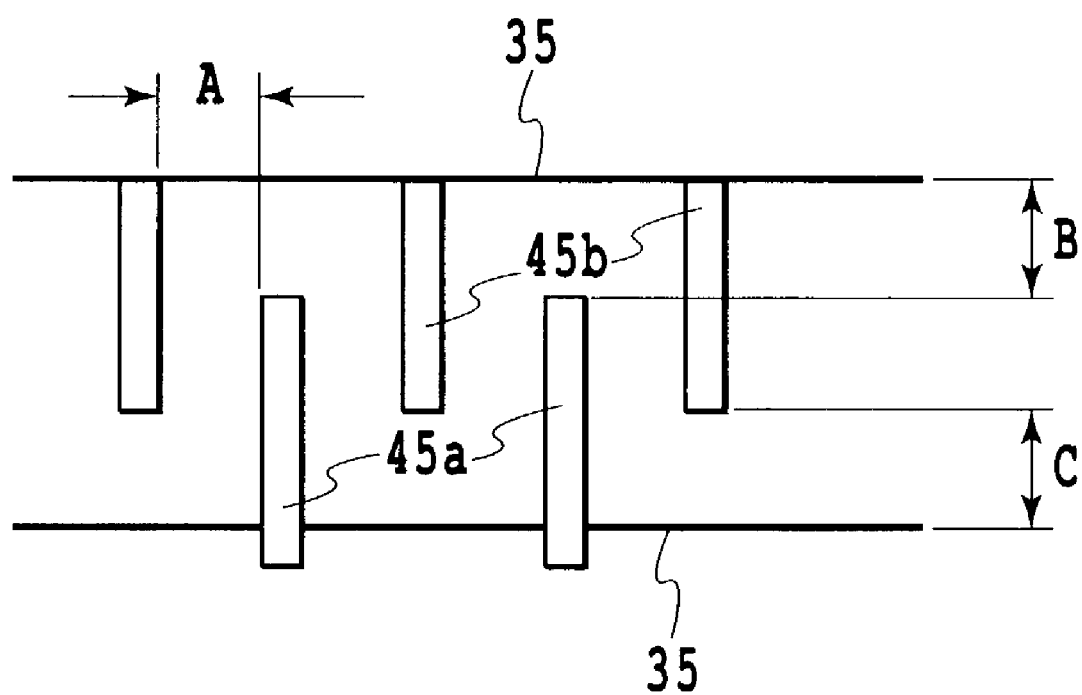
FIG. 2B is an enlarged sectional view for explaining the definition of a clearance.

In the embodiment shown in FIGS. 2A and 2B, while the flow-path restricting section 45 has the rotary plates 45a and the stationary plates 45b arranged alternately with each other, the rotary plates 45a and the stationary plates 45b are not necessarily arranged in an alternate manner. Also, the flow-path restricting section 45 may be structured solely by either one of the rotary plate 45a or the stationary plate 45b. While the rotary plate 45a or the stationary plate 45b is completely circular or ring-shaped as seen from the end surface side thereof, it may be of a shape partially lacked.

While the rotary plate 45a or the stationary plate 45b is located to be vertical to the longitudinal direction of the tube in the embodiment shown in FIGS. 2A and 2B, it may be slanted to have a certain angle other than a right angle relative to the longitudinal direction of the tube.

While the flow-path restricting section 45 and the screw section 41 are alternately provided in the longitudinal direction of the tube in the embodiment shown in FIGS. 2A and 2B, it is possible to provide the flow-path restricting section 45 in the same area as the screw section 41 if the rotary plate 45a is eliminated and a size of the stationary plate 45b is properly determined.

Figure 3A:
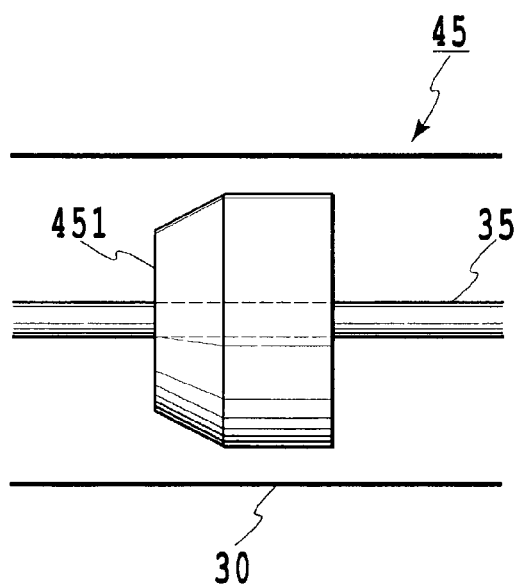
FIGS. 3A to 3C are sectional views, respectively, of other embodiments of the flow-path restricting member than that shown in FIG. 2A.
Figure 3B:
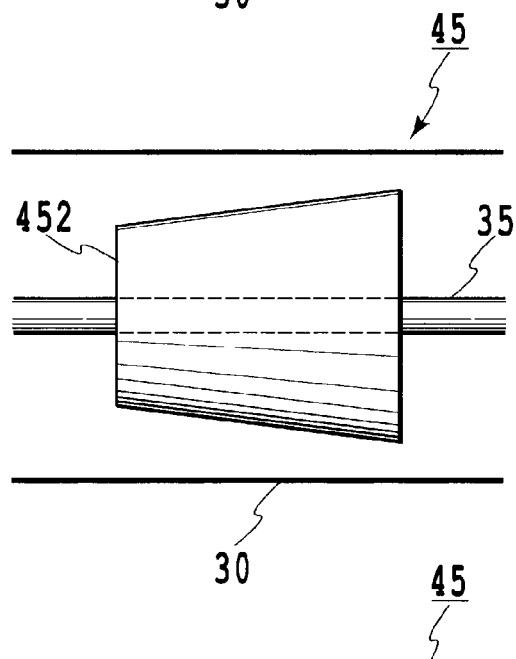
Figure 3C:
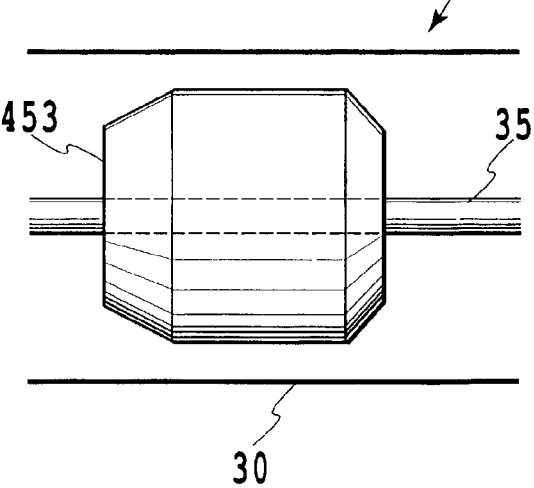

While the flow-path restricting section 45 is formed of the rotary plates 45a and the stationary plates 45b in the embodiment shown in FIGS. 2A and 2B, members shown in FIGS. 3A to 3C may be used instead of or in addition to the former. In FIG. 3A, a restricting member 451 of a truncated conical plus cylindrical shape is attached to the rotary shaft 35; in FIG. 3B, a restricting member 452 of a truncated conical shape is attached to the rotary shaft 35; and in FIG. 3c, a restricting member 453 of a truncated conical, cylindrical plus reverse truncated conical shape is attached to the rotary shaft 35.

In the above-described embodiment, the cleaning bath 30 is formed of two tubes in FIG. 1A (one tube in FIG. 1B) arranged in horizontal in a side-by-side manner. However, the cleaning bath is not limited to the above shape. For example, the number of tubes may be three or more, the cross-section thereof may be rectangular or the tubes may be disposed in the vertical direction (upward/downward). In this regard, the horizontal type is preferable because the structure becomes simple. Also, the cleaning bath may be structured so that the interior pressure thereof gradually increases as going to the downstream by making the diameter of the tube to be smaller toward the downstream.

No description has been made on the maintenance of the apparatus in the above embodiment. For example, if the screw section 41 and the flow-path restricting section 45 are formed by a segment system, the assembly and/or disassembly thereof becomes easy to enhance the maintenance ability. Also, since it is possible to replace solely a malfunctioning part, a cost merit is obtained. It is also possible to replace the member to one having a rough surface suitable for the desired degree of cleaning.

When the cleaning bath 30 is structured to be dividable into the desired parts (two, three or four parts) in the longitudinal direction, the cleaning of the interior of the apparatus or the replacement of parts is facilitated.

In the above embodiment, the cleaning operation carried out by the impingement of the polymeric piece to the rough surface so that the surface of the polymeric piece is scraped has solely been described. However, if an ultra-sonic cleaning is additionally used, it is possible to remove the foreign matters such as label or seal adhered to a recess of the polymeric piece to which the rough surface is difficult to be in contact, whereby the cleaning effect is further enhanced. The ultra-sonic element may be provided on the outer surface of the tube, for example.

In this regard, instead of or in addition to the ultra-sonic cleaning, cleaning particles or cleaning agent may be used. Also, instead of or in addition to water, a cleaning liquid such as surfactant may be used. In such cases, a process for removing the cleaning particles, cleaning agent or cleaning liquid from the cleaned polymeric pieces is necessary.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for cleaning polymeric pieces, comprising:
    an elongate stationary cleaning bath having a rotary shaft extending in the longitudinal direction of the cleaning bath and driven by a drive source, the cleaning bath having a water supply port and a drainage port as well as a polymeric piece introduction port at one end and a polymeric piece discharging port at the other end;
    a screw integral with the rotary shaft rotatable relative to the cleaning bath for advancing water and polymeric pieces in the cleaning bath from the one end to the other end thereof by rotating them within the cleaning bath; and
    a plurality of stationary plates standing upright from an inner surface of the cleaning bath toward the rotary shaft; and
    a plurality of rotary plates standing upright from the circumference of the rotary shaft toward the inner surface of the cleaning bath;
    wherein the rotary plates and the stationary plates are alternatively arranged in the longitudinal direction of the bath to form a labyrinth in order to make the polymeric pieces to deviate their advanced direction by impinging to end surfaces of said rotary plates and said stationary plates and to increase the number of contacts made by the polymeric pieces within the cleaning bath during their advancement.

2. An apparatus for cleaning polymeric pieces as defined by claim 1, wherein the screw is provided in a longitudinal section of the cleaning bath, and the rotary plates and the stationary plates each having a rough section on at least part of a surface thereof are arranged in a section of the bath in which no screw is provided, for restricting the advancement of the water caused by the screw, wherein the surface roughness of the rough section of the plates has maximum height in a range from 40 to 2000 μm.

3. An apparatus for cleaning polymeric pieces as defined by claim 2, wherein the rotary plate is located so that a tip end of the rotary plate alternates with a tip end of the stationary plate in the longitudinal direction.

4. An apparatus for cleaning polymeric pieces, comprising:
    a tubular stationary cleaning bath having a polymeric piece introduction port at one end and a polymeric piece discharging port at the other end thereof; and
    a plurality of screw sections and a plurality of flow-path restricting sections arranged alternately in the longitudinal direction within the cleaning bath;
    wherein the screw section each comprises a screw provided on a rotary shaft held in the cleaning bath in a rotatable manner, the rotary shaft being rotatable relative to the cleaning bath, and
    the flow-path restricting section each comprises a plurality of stationary plates standing upright from the inner surface of the cleaning bath and a plurality of rotary plates arranged so that end surfaces of the rotary plates are opposed to end surfaces of the stationary plates at a predetermined gap between the both; wherein the rotary plates and the stationary plates are alternatively arranged in the longitudinal direction of the bath to form a labyrinth in order to make the polymeric pieces to deviate their advanced direction by impinging to end surfaces of said rotary plates and said stationary plates and to increase the number of contacts of polymeric pieces within the cleaning bath during their advancement.

5. An apparatus for cleaning polymeric pieces as defined by claim 4, wherein at least one of a tubular inner surface of the cleaning bath, an exposed surface of the rotary shaft, a blade surface of the screw, an end surface of the rotary plate and an end surface of the stationary plate has a roughened section, wherein the surface roughness of the roughened section has the maximum height in a range from 40 to 2000 μm.

6. An apparatus for cleaning polymeric pieces as defined by claim 5, wherein the surface roughness of the roughened section has the maximum height in a range from 50 to 1000 μm.

7. An apparatus for cleaning polymeric pieces as defined by claim 5, wherein the surface roughness of the roughened section has the maximum height in a range from 60 to 500 μm.

8. An apparatus for cleaning polymeric pieces as defined by claim 4, wherein a pitch of the screw blade is in a range from 0.3D to 3D wherein D is a diameter of the screw blade.

9. An apparatus for cleaning polymeric pieces as defined by claim 4, wherein a size of the polymeric piece introduction port and discharging port is determined for allowing the polymeric piece having a length in a range from 1 to 45 mm to pass through them.

* * * * *